(12) United States Patent
Yoshida et al.

(10) Patent No.: US 8,834,118 B2
(45) Date of Patent: Sep. 16, 2014

(54) LINK PIN EXCHANGING DEVICE FOR WIND TURBINE GENERATOR AND LINK PIN EXCHANGING METHOD

(75) Inventors: Nobuhiko Yoshida, Tokyo (JP); Kunikazu Watanabe, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 228 days.

(21) Appl. No.: 12/675,294

(22) PCT Filed: Feb. 10, 2010

(86) PCT No.: PCT/JP2010/051953
§ 371 (c)(1),
(2), (4) Date: Jun. 9, 2010

(87) PCT Pub. No.: WO2011/099121
PCT Pub. Date: Aug. 18, 2011

(65) Prior Publication Data
US 2012/0003095 A1    Jan. 5, 2012

(51) Int. Cl.
*B63H 3/08*    (2006.01)
*F03D 7/02*    (2006.01)

(52) U.S. Cl.
CPC ............. *F03D 7/0224* (2013.01); *Y02E 10/723* (2013.01); *F05B 2260/79* (2013.01); *Y02E 10/721* (2013.01)
USPC ........................................... 416/154; 29/428

(58) Field of Classification Search
USPC ............. 59/7, 11; 416/154, 153; 29/809, 252, 29/428
See application file for complete search history.

(56) References Cited

U.S. PATENT DOCUMENTS

| | | | |
|---|---|---|---|
| 2,356,899 A * | 8/1944 | Stutter | 92/108 |
| 4,349,952 A | 9/1982 | Decker et al. | |
| 4,506,501 A * | 3/1985 | DeVall et al. | 59/7 |
| 5,481,797 A * | 1/1996 | Barker | 29/809 |
| 6,453,657 B1 * | 9/2002 | Teravainen | 59/7 |
| 7,562,518 B2 * | 7/2009 | Daniels et al. | 59/7 |
| 2007/0193247 A1 * | 8/2007 | Daniels et al. | 59/7 |

FOREIGN PATENT DOCUMENTS

| | | |
|---|---|---|
| CN | 2421111 Y | 2/2001 |
| CN | 2843728 Y | 12/2006 |
| CN | 201201215 Y | 3/2009 |
| CN | 201579583 U1 | 9/2010 |
| JP | 2205420 A | 8/1990 |

(Continued)

OTHER PUBLICATIONS

IP Australia Office Action regarding Australian Patent application 2010201619 dated Mar. 4, 2011 by Mark Blanchard.*

(Continued)

*Primary Examiner* — Jermie E Cozart
*Assistant Examiner* — Jacob Cigna
(74) *Attorney, Agent, or Firm* — Benjamin J. Hauptman; Manabu Kanesaka (57) ABSTRACT

A link pin exchanging device for a wind turbine generator that can efficiently carry out exchange of the link pin in the rotor hub, and a link pin exchanging method. The link pin exchanging device comprises an actuator for moving the link pin so that the link pin disengages from the link mechanism, and a reaction force receiving member for receiving a reaction force that acts on the actuator, independent from the wall surface of the rotor hub that intersects with the operating direction of the actuator.

9 Claims, 6 Drawing Sheets

(56) References Cited

FOREIGN PATENT DOCUMENTS

| JP | 3189374 | A | 8/1991 |
|---|---|---|---|
| JP | 2587509 | B2 | 3/1997 |
| JP | 11028677 | A | 2/1999 |
| JP | 3661727 | B2 | 6/2005 |

OTHER PUBLICATIONS

Australian Office Action for AU 2010201619, issued Mar. 4, 2011.
Office Action for AU2010201619 dated Feb. 17, 2012.
Canadian Office Action dated Dec. 14, 2011 issued to corresponding Canadian patent application No. 2693871.
Notice of Allowance dated Aug. 7, 2012 as issued in corresponding Japanese Application No. 2010-506730 with translation.
Notice of Allowance dated Jul. 31, 2012 as issued in corresponding Korean Application No. 10-2010-7008778 with translation.
Notice of Allowance dated Mar. 22, 2013 as issued in corresponding Canadian Application No. 2693871.
International Preliminary Report on Patentability dated Aug. 14, 2012, for PCT/JP2010/051953, International filing date Feb. 10, 2010, with English translation.
Acceptance Notice for AU2010201619 dated Jul. 9, 2012.
Office Action for CA2,693,871 dated Jul. 19, 2012.
Office Action issued May 20, 2014, corresponds to Chinese patent application No. 201080000727.

\* cited by examiner

LINK PIN EXCHANGING DEVICE FOR WIND TURBINE GENERATOR AND LINK PIN EXCHANGING METHOD

RELATED APPLICATIONS

The present application is a national phase of, PCT/JP2010/51953, filed Feb. 10, 2010, the disclosure of which is hereby incorporated by reference herein in its entirety.

BACKGROUND OF THE INVENTION

1. Field of the Invention

The present invention relates to a link pin exchanging device for a wind turbine generator and a link pin exchanging method. In particular, the invention relates to a link pin exchanging device for exchanging a link pin of a link mechanism in a rotor hub of a wind turbine generator, and to a method for exchanging the link pin.

2. Description of the Related Art

In recent years, from a view point of preserving the global environment, the use of wind turbine generators to generate reusable energy has become popular.

In general, a wind turbine generator comprises a rotor head equipped with blades, a nacelle accommodating a drive train and a generator, and a tower supporting the nacelle. The drive train is for transmitting a torque from the rotor head side to the generator side, and usually includes a gear box so that rotational speed of the rotor head is increased to transmit to the generator. Such a wind turbine generator is normally provided with a pitch control mechanism in the rotor head for changing pitch angles of the blades, so as to stop the rotation of a rotating shaft for safety measures during strong winds or for maintenance reasons.

Since the pitch control mechanisms that are attached to each of the blades adjust the pitch angle of each of the blades interlockingly, the pitch control mechanisms may be coupled together by a link mechanism. For example, Japanese Unexamined Patent Application Publication No. H3-189374 describes a link mechanism provided in a rotor hub that adjusts the pitch angle of each of the blades interlockingly.
Japanese Unexamined Patent Application Publication No. H3-189374

SUMMARY OF THE INVENTION

In the link mechanism as described in Japanese Unexamined Patent Application Publication No. H3-189374, a link lever is supported by a supporting point bracket to freely rotate around a link pin via a flat bearing (a plain bearing). However, when lubrication grease is not sufficiently supplied between the link pin and the flat bearing, or if abrasion powder of the link pin or the flat bearing accumulates over time, the link pin may become stuck to the supporting point bracket or to the link lever. Thus it becomes necessary to periodically exchange the link pin by some kind of method.

One method for exchanging the link pin is to use a hydraulic jack to push the link pin out of the link mechanism.

Figure 12:
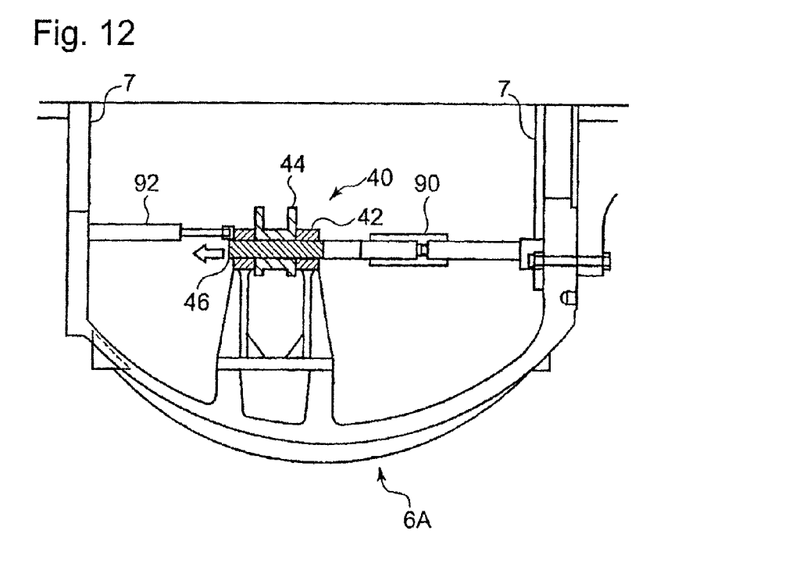
FIG. 12 is a view explaining the link pin exchanging method.

FIG. 12 shows how a link pin is pushed out by a hydraulic jack from a link mechanism in a rotor hub. As shown in the figure, a link mechanism 40 comprises a supporting point bracket 42, a link lever 44, and a link pin 46. The supporting point bracket 42 is fixed to the floor surface of a rotor hub 6A, and the link lever 44 is supported by the supporting point bracket 42 via the link pin 46. To push the link pin 46 out from the link mechanism 40, a hydraulic jack 90 is attached between the link pin 46 and a wall surface of the rotor hub 7 that intersects with a line extending from an extrusion direction of the link pin 46, then the link pin 46 is pushed out by the hydraulic jack 90 in the direction of the arrow. The hydraulic jack 90 is pressed to the wall surface 7 of the rotor hub 6A so that the reaction force that acts on the hydraulic jack 90 can be received by the wall surface 7 of the rotor hub 6A. A reaction force receiving jack 92 is provided on the opposite side of the link mechanism 40 between the wall surface 7 of the rotor hub 6A so as to prevent the supporting point bracket 42 from collapsing from the extrusion force of the hydraulic jack 90.

However, in many cases, the distance between the link mechanism 40 and the wall surface 7 of the rotor hub 6A is long, or the wall surface 7 at the extended line of the shaft center of the link pin 46 (that is, the place where the hydraulic jack 9 presses the wall surface 7) is not flat. Thus, when the above-described method is used to exchange the link pin 46, the hydraulic jack 90 or the reaction force receiving jack 92 may disengage, or the line of action of the extrusion force of the hydraulic jack 90 may go out of alignment from the shaft center of the link pin 46, causing a need to apply more extrusion force.

The present invention has been devised in view of the above situation and it is an object of the present invention to provide a link pin exchanging device for a wind turbine generator that can efficiently carry out exchange of the link pin in the rotor hub, and to provide a link pin exchanging method.

Means for Solving the Problems

The present invention provides a link pin exchanging device for a wind turbine generator for exchanging a link pin of a link mechanism in a rotor hub of the wind turbine generator, comprising: an actuator that moves the link pin so that the link pin disengages from the link mechanism; and a reaction force receiver that receives a reaction force which acts on the actuator, independent from a wall surface of the rotor hub that intersects with the operating direction of the actuator.

Here, the "link pin" of the link mechanism refers to parts such as long pins and bushes used in link mechanisms. For example, the link pin may be a long pin used to support the link lever of the link mechanism to the supporting point bracket. Further, the "actuator" is not specifically limited, as long as it has a configuration capable of moving the link pin. It can be, for example, a hydraulic jack, a screw jack, a rack jack, an air cylinder or a hydraulic cylinder.

Further, the reaction force receiver of the above link pin exchanging device receives the reaction force from the actuator independently from at least the wall surface of the rotor hub that intersects with the operating direction of the actuator, and does not necessarily have to receive the reaction force from the actuator independently from the entire wall surface of the rotor hub. Here, "the wall surface of the rotor hub that intersects with the operating direction of the actuator" refers to the wall surface of the rotor hub that intersects with the line extended from either the extrusion or extraction direction of the link pin by the actuator.

For example, if the link pin is a long pin that supports the link lever of the link mechanism to the supporting point bracket, the reaction force receiver may be supported by a tower standing on the inside surface (floor surface) of the rotor hub along the supporting point bracket, as long as the reaction force receiver receives the reaction force independent from the wall surface of the rotor hub that intersects with the line extended from the shaft center of the long pin.

According to this link pin exchanging device, the reaction force receiver for receiving the reaction force that acts on the actuator moving the link pin receives the reaction force independent from the wall surface of the rotor hub that intersects with the operating direction of the actuator. Thus, when exchanging the lock pin, it is possible to prevent the actuator from disengaging or the line of action of the extrusion or extraction force of the actuator from misaligning from the shaft center of the link pin. Therefore, the link pin exchanging device enables link pin exchange in the rotor hub to be carried out efficiently.

In the above link pin exchanging device for the wind turbine generator, it is preferable that the actuator is a jack that extrudes the link pin from the link mechanism, and that the reaction force receiver includes: a first member that supports the back surface of the actuator; a second member provided on the opposite side of the first member across the actuator and the link mechanism, having a through hole through which the link pins extruded from the link mechanism passes; and a connecting member that connects the first member and the second member.

Since the reaction force receiver is configured so that the first member and the second member arranged to sandwich the jack and the link mechanism are connected by the connecting member, it makes in possible to easily align the line of action of the extrusion force of the jack with the shaft center of the link pin when the link pin exchanging device is mounted on the link mechanism. Further, this configuration makes it possible to reduce the size of the link pin exchanging device, and thus improves the workability and safety of the device.

Preferably, the reaction force receiver is structured such that the first member, the second member and the connecting member each are separate members, and the connecting member includes a pair of tie bolts arranged along the operating direction of the actuator and pierces at least either the first member or the second member, and a nut screwed to the tie bolt that restricts the first member and/or the second member that is pierced by the tie bolt from coming off the tie bolt.

By structuring the first member, the second member and the connecting member (the tie bolt and the nut) as separate members, it is possible to easily install these members into the narrow rotor hub.

Alternatively, the reaction force receiver may have an integrated structure where the first member, the second member and the connecting member are welded together.

By welding and integrating the first member, the second member and the connecting member, the link pin exchanging device can be mounted to the link mechanism more quickly and will improve work efficiency.

With the link pin exchanging device for the wind turbine generator, the actuator can be a jack that extracts the link pin from the link mechanism, and the reaction force receiver can be a spacer arranged between the actuator and the link mechanism.

Since the reaction force receiver is the spacer arranged between the link mechanism and the jack for extracting the link pin, it makes in possible to easily align the line of action of the extraction force of the jack with the shaft center of the link pin when the link pin exchanging device is mounted on the link mechanism. Further, this configuration makes it possible to reduce the size of the link pin exchanging device, and thus improves the workability and safety of the device.

With this link pin exchanging device, the actuator is preferably a center hole jack that includes: a casing; a cylindrical inner cylinder arranged inside the casing; a piston rod that is provided in a slidable manner between the casing and the inner cylinder; and a tension bar arranged in the inner side of the inner cylinder having one end portion fixed to the piston rod and the other end portion screwed to the link pin.

The link pin exchanging method for a wind turbine generator of the present invention uses the link pin exchanging devices described above and comprises: removing the lock pin from the link mechanism; and inserting a new lock pin into the link mechanism.

Effects of the Invention

According to the link pin exchanging device of the present invention, the reaction force receiver for receiving the reaction force that acts on the actuator for moving the link pin receives the reaction force independent from the wall surface of the rotor hub that intersects with the operating direction of the actuator. Thus, it is possible to prevent the actuator from disengaging or the line of action of the extrusion or extraction force of the actuator from misaligning with the shaft center of the link pin, when the lock pin is being exchanged. Therefore, the link pin exchanging device enables link pin exchange in the rotor hub to be carried out efficiently.

DETAILED DESCRIPTION OF THE PREFERRED EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present.

First, a description will be given of an example of the wind turbine generator employing the link pin exchanging device of the present embodiment, followed by a description of the link pin exchanging device of the present embodiment.

Figure 1:
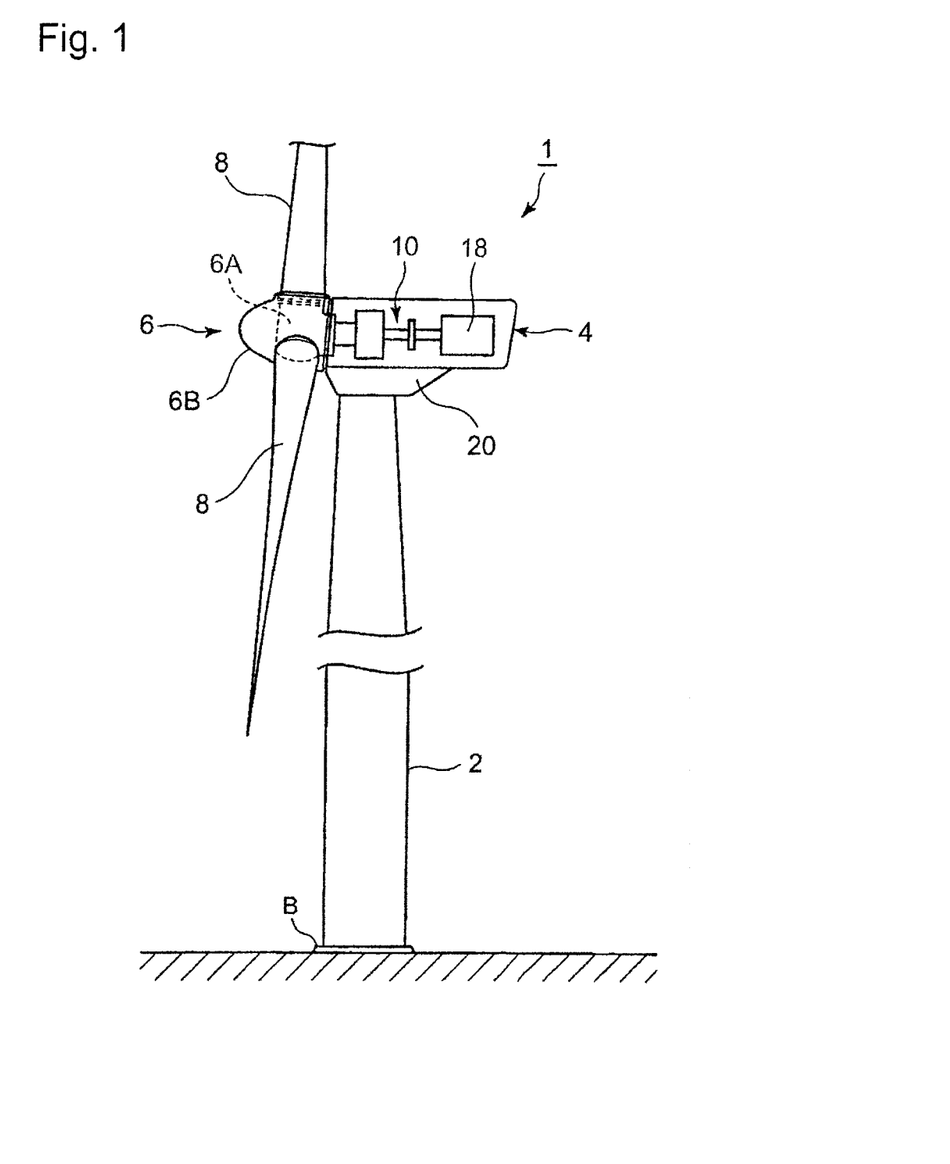
FIG. 1 is a view showing an example of the overall structure of a wind turbine generator.

FIG. 1 is a view showing an example of the overall structure of the wind turbine generator employing the link pin exchanging device of the present embodiment. A wind turbine generator 1 mainly includes, as shown in FIG. 1, a tower 2 provided to stand on a foundation B, a nacelle 4 provided on the upper end of the tower 2, a rotor head 6 provided on the nacelle 4, and a plurality of blades 8 attached to the rotor head 6.

As shown in FIG. 1, the tower 2 has a column-like shape extending upwardly (to the upper end of FIG. 1) from the foundation B. The tower 2, for example, can be made from a single column-like member or made from a plurality of units aligned in upright direction and coupled to each other. If the tower 2 is made from the plurality of units, the nacelle 4 is provided on the unit located on the top of the tower 2.

The nacelle 4 supports the rotor head 6 and accommodates a drive train 10 and a generator 18, etc.

Figure 2:
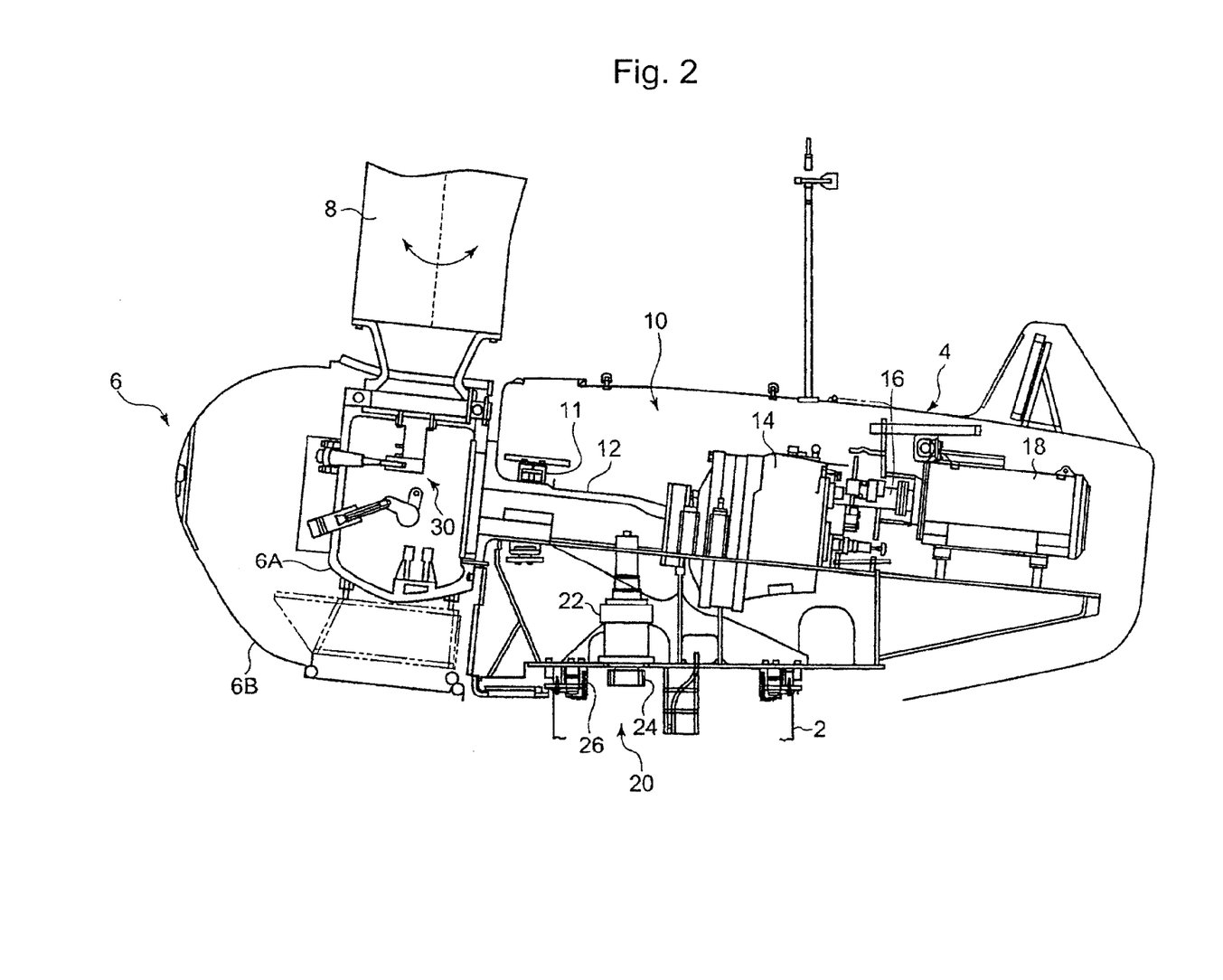
FIG. 2 is a transverse view showing a drive train and a generator provided within a nacelle.

FIG. 2 shows a detailed view of the drive train 10 and the generator 18 inside the nacelle 4. The drive train 10 includes a main shaft 12 that is connected to a rotor hub 6A of a rotor head 6, a gear box 14 connected to the main shaft 12 and a coupling 16 that couples the gear box 14 to the generator 18.

The rotor head 6 shown in FIGS. 1 and 2 is supported on the nacelle 4 so as to rotate around a substantially horizontal axis, and includes the rotor hub 6A equipped with blades 8 and a head capsule 6B for covering this rotor hub 6A.

Further, as shown in FIG. 2, the rotor hub 6A is equipped with a pitch driving device 30 that rotates the blades 8 around an axis extending in a longitudinal direction of the blades 8 (in a direction designated by an arrow in FIG. 2) and varies the pitch angle of the blades 8.

Figure 3:
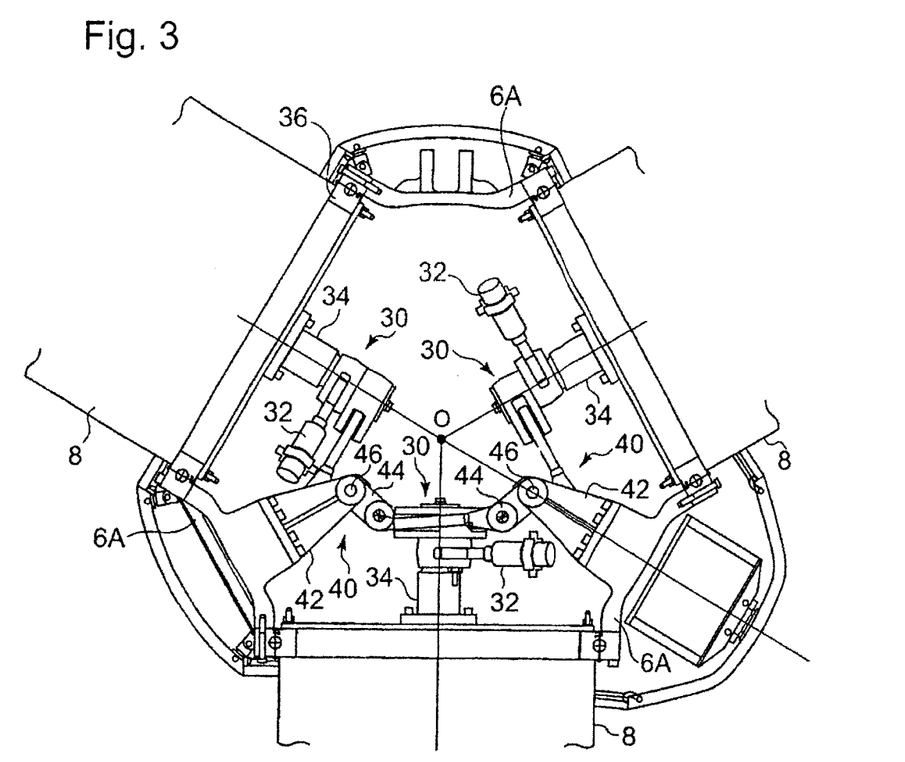
FIG. 3 is a view showing an example of a structure of a pitch driving device.
Figure 4:
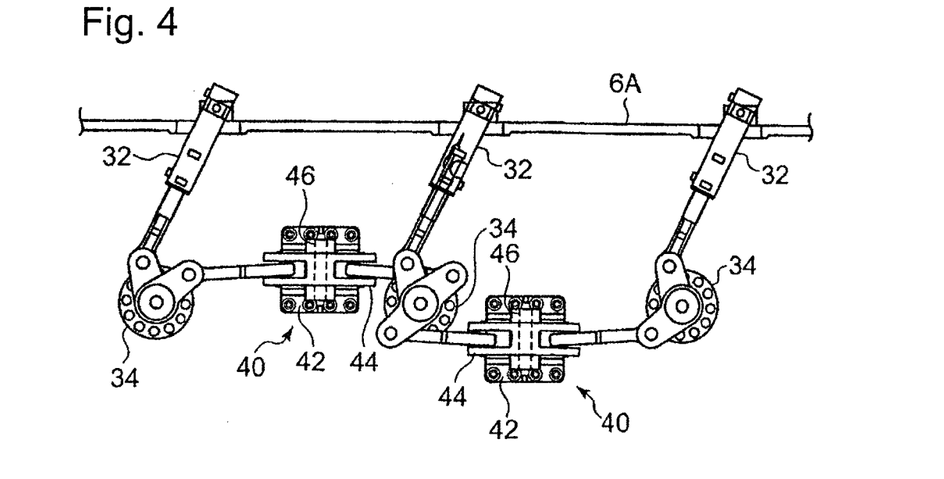
FIG. 4 is an expansion view showing the pitch driving device in FIG. 3 from a center point O of the rotor head.

FIG. 3 is a view showing an example of a structure of the pitch driving device 30. FIG. 4 is an expansion view showing the link mechanism of the pitch driving device 30 in FIG. 3 from a center point O of the rotor head.

As shown in FIG. 3, the pitch drive device 30 includes a cylinder 32 and a shaft member 34 connected to the blades 8. The blades 8 are rotatably supported by a shaft bearing 36 for rotating in the direction of the pitch. By this structure, when the shaft member 34 is rotated by the cylinder 32, the blades 8 rotate with the shaft member 34 in the pitch direction.

The pitch drive devices 30 are provided in each of the blades 8 and are connected together by a link mechanism 40 as shown in FIGS. 3 and 4, to thereby interlockingly control the pitch angles of each of the blades. The link mechanism 40 includes a supporting point bracket 42 fixed to a wall surface (floor surface) of the rotor hub 6A and a link lever 44 that is supported by the link pin 46 to the supporting point bracket 42. With this structure, since the link lever 44 rotates with the link pin 46 as the support, the link mechanism 40 can transfer the movement of one pitch device 30 to another pitch device 30.

With the wind turbine generator 1 having this structure, the link pin 46 of the link mechanism 40 may become stuck to the supporting point bracket 42 or to the link lever 44, due to insufficient grease feeding or abrasion powder (abrasion powder of the link pin 46 or the flat bearing supporting the link pin 46, not shown) that has accumulated over time. In such cases, it is necessary to use a link pin exchanging device such as the one described below to detach the link pin 46 from the link mechanism 40 and exchange it with a new link pin.

First Embodiment

Figure 5:
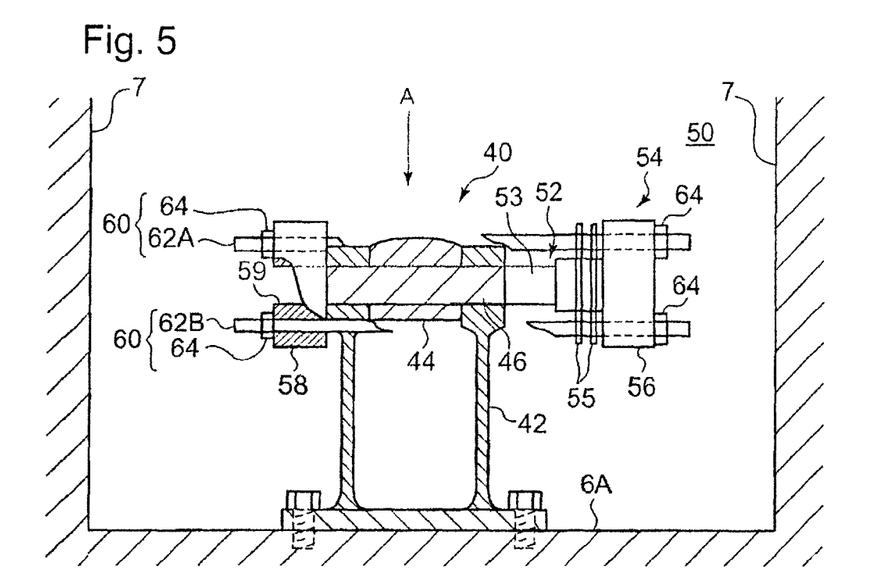
FIG. 5 is a partial cross-sectional side view of an example of a structure of a link pin exchanging device according to a first embodiment.
Figure 6:
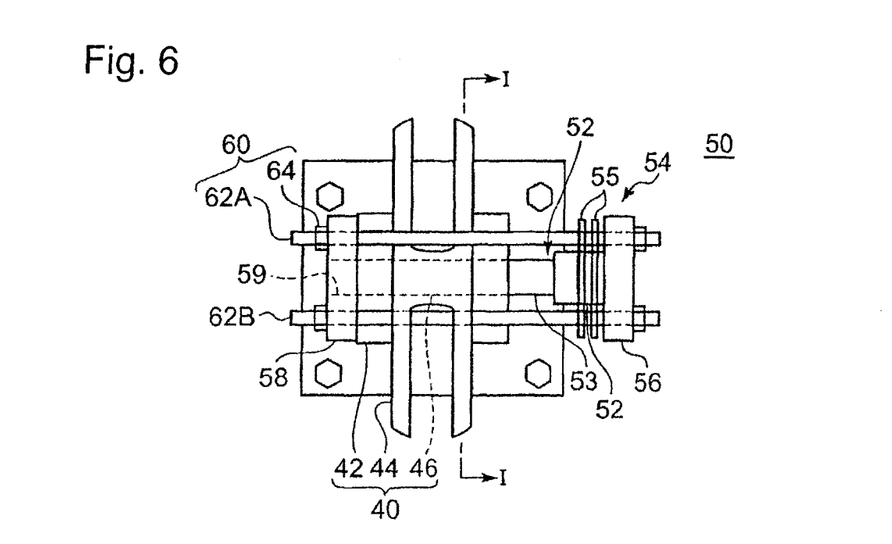
FIG. 6 is a top view of the link pin exchanging device in FIG. 5 viewed from direction A.
Figure 7:
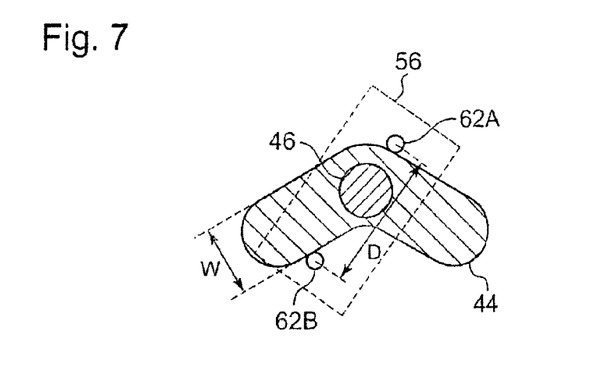
FIG. 7 is a sectional view along line I-I in FIG. 6.

FIG. 5 is a partial cross-sectional side view showing an example of a structure of a link pin exchanging device according to a first embodiment. FIG. 6 is a top view of the link pin exchanging device in FIG. 5 viewed from direction A. FIG. 7 is a sectional view along line I-I of FIG. 6.

As shown in FIGS. 5 and 6, a link pin exchanging device 50 mainly comprises an actuator 52 that extrudes a link pin 46 and a reaction force receiving member 54 (a reaction force receiver) that receives a reaction force that acts on the actuator 54.

The actuator can be, for example, a hydraulic jack, screw jack, a rack jack, an air cylinder, a hydraulic jack, or the like, as long as it is configured so that it is capable of extruding the link pin 46. As an example of the actuator 52, FIGS. 5 and 6 show a hydraulic jack having a piston 53 that extends and contracts by pressurized hydraulic oil.

In FIGS. 5 and 6, an example is given where the piston 53 of the actuator (hydraulic jack) 52 directly extrudes the link pin 46. However, according to the movable distance of the piston 53, a spacer can be interposed between the link pin 46 and the piston 53. By this, even if the link pin 46 is long, the link pin exchanging device 50 can completely extrude the link pin 46 from the link mechanism 40.

The reaction force receiving member 54 is attached to the link mechanism 40 independent from the entire wall surface of the rotor hub 6A of the rotor head 6. With this structure, the reaction force receiving member 54 receives the reaction force acting on the actuator 52 independently from the wall surface 7 of the rotor hub 6A that intersects with the line of extension of the operating direction of the actuator 52. For example, as shown in FIGS. 5 and 6, the reaction force receiving member 54 can be configured by a first member 56, a second member 58 and a connecting member 60 that are formed separately.

The first member 56 supports the back surface of the actuator 52, and can be provided so that it abuts against the back surface of the actuator 52, or can be provided to support the back surface of the actuator 52 via the spacer.

The second member 58 is provided on the opposite side of the first member 56 across the actuator 52 and the link mechanism 40, and a through hole 59 is formed in the vicinity of the center thereof. The through hole 59 has a diameter larger than that of the link pin 46, making it possible for the link pin 46 to pass through.

The connecting member 60 connects the first member 56 and the second member 58. In the example shown in FIGS. 5 and 6, the connecting member 60 includes a pair of tie bolts 62 (62A and 62B) arranged along the link pin 46, and nuts 64 screwed to the tie bolts 62 (62A and 62B). The tie bolt 62 is formed of a rod-like member having a screw formed on at least one portion thereof (preferably, a rod-like member that is fully threaded) and pierces the first member 56 and the second member 58. The nut 64 restricts the first member 56 and the second member 58 from coming off the tie bolt 62.

As described above, the reaction force receiving member 54 is configured so that the first member 56 is provided to support the back surface of the actuator (hydraulic jack) 52, the second member 58 is provided on the opposite side of the first member 56 across the actuator 52 and the link mechanism 40, and the connecting member 60 including the tie bolt 62 and the nut 64 connects the first member 56 and the second member 58. With this structure, the reaction force generated when the actuator 52 is operated is received by the first member 56, the second member 58 and the connecting member 60. Therefore, the extrusion force of the actuator 52 can reliably be transmitted to the link pin 46. Further, since the link pin 46 extruded by the actuator 52 passes through the through hole 59 formed in the second member 58, the link pin 46 does not interfere with the second member 58 and thus the link pin 46 can be removed smoothly.

Further, to prevent the actuator 52 from misaligning during operation, an actuator receiving plate 55 having a through hole through which the actuator 52 can penetrate may be provided as shown in FIGS. 5 and 6. By this, the actuator 52 can be held by the through hole of the actuator receiving plate 55, and thus can securely prevent the actuator 52 from misaligning during operation. In the examples shown in FIGS. 5 and 6, the actuator receiving plate 55 is supported by the tie bolts 62 (62A and 62B).

As shown in FIG. 7, in the link pin exchanging device 50 having the above structure, the pair of tie bolts 62 (62A and 62B) of the reaction force receiving member 54 attaches to the link mechanism 40 while squeezing the link lever 44 and the link pin 46.

For this, the first member 56 and the second member 58 are first arranged on both sides of the link mechanism 40, and are temporarily fixed on both sides of the link lever 44 with the tie bolts 62 (62A and 62B) and the nuts 64. Then, the actuator 52 is arranged between the first member 56 and the link mechanism 40, followed by positioning the shaft center of the piston 53 of the actuator (hydraulic jack) 52, the shaft center of the link pin 46, and the center of the through hole 59 of the second member 58 so that they align. Then, the nut 64 is screwed to thereby completely fix the link pin exchanging device 50 to the link mechanism 40.

Further, as shown in FIG. 7, if the spacing D of the tie bolts 62 (62A and 62B) is kept sufficiently wider than the width W of the link lever 44, it is possible to position the piston 53 of the actuator 52 with the center or the shaft center of the link pin 46 and the through hole 59 with a high degree of freedom, even if the supporting point bracket 42 and the link lever 44 are in a mounted state.

As described above, according to the present embodiment, the reaction force receiving member 54 for receiving the reaction force that acts on the actuator 52 extruding the link pin 46 receives the reaction force from the actuator 52 independent from the wall surface 7 of the rotor hub 6A that intersects with the line extending from the operating direction of the actuator 52. Thus, when exchanging the lock pin 46, it is possible to prevent the actuator 52 from disengaging or the line of action of the extrusion force of the actuator 52 from misaligning from the shaft center of the link pin 46. This allows exchanging the link pin 46 in the rotor hub 6A to be carried out efficiently.

Further, as described above, by using a jack that extrudes the link pin 46 as the actuator 52 and configuring the reaction force receiving member 54 to include: the first member 56 that supports the back surface of the actuator 52; the second member 58 provided on the opposite side of the first member 56 across the actuator 52 and the link mechanism 40, having a through hole 59 through which the link pin 46 passes; and the connecting member 60 for connecting the first member 56 and second member 58, it makes in possible to easily align the line of action of the extrusion force of the actuator (jack) 52 with the shaft center of the link pin 46 when the link pin exchanging device 50 is mounted on the link mechanism 40. Further, this configuration makes it possible to reduce the size of the link pin exchanging device 50, and thus improves the workability and safety of the device.

In this case, the first member 56, the second member 58 and the connecting member 60 of the reaction force receiving member 54 are each separately formed members. The connecting member 60 can include a pair of tie bolts 62 (62A and 62B) arranged along the operating direction of the actuator 52, and nuts 64 screwed to the tie bolts 62 (62A and 62B) that restrict the first member 56 and the second member 58 from coming off the tie bolt 62.

In this way, since the first member 56, the second member 58 and the connecting member 60 (the tie bolts 62 and the nuts 64) are separate members, it is possible to easily install these members in the narrow rotor hub 6A.

In the above embodiment, an example is given where the tie bolts 62 (62A and 62B) pierces both the first member 56 and the second member 58. However, the tie bolts 62 (62A and 62B) can be structured to pierce only either one of the first member 56 or the second member 58. For example, the tie bolt 62A may pierce only the first member 56 and be screwed to a non-through hole provided on the second member 58, while the tie bolt 62B may pierce only the second member 58 and be screwed to a non-through hole provided on the first member 56.

Figure 8:
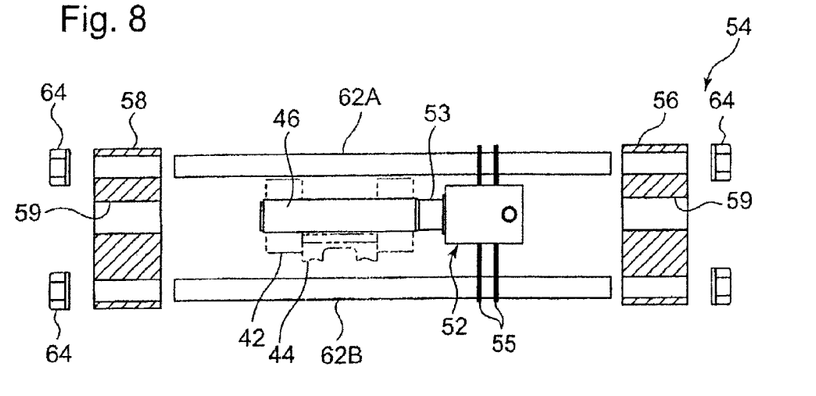
FIG. 8 is a partial cross-sectional side view showing a structure of a variation example of the link pin exchanging device of FIG. 5.

Further, in the above embodiment, an example is given where the first member 56 and the second member 58 have different forms from each other. However, as shown in FIG. 8, the first member 56 and the second member 58 can have a common form. That is, both the first member 56 and the second member 58 can have through holes 59 and can support the back surface of the actuator 52. By making the form of the first member 56 and the second member 58 common, the operator exchanging the link pin 46 does not need to distinguish the first member 56 from the second member 58, and thus will improve work efficiency.

The above described embodiment was an example where the first member 56, the second member 58 and the connecting member 60 of the reaction force receiving member 54 were separate members, however, these members can be welded and be fixed to each other.

Figure 9:
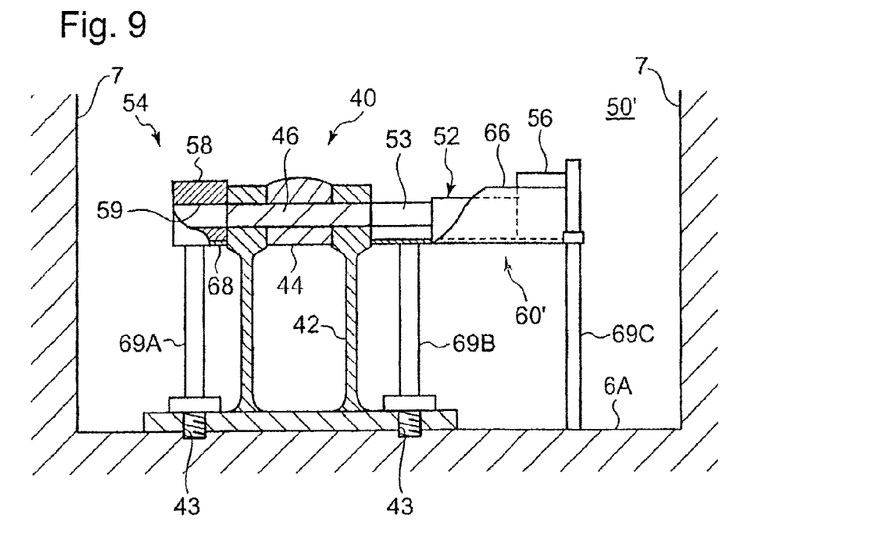
FIG. 9 is a partial cross-sectional side view showing a structure of another variation example of the link pin exchanging device of FIG. 5.

FIG. 9 is a partial cross-sectional side view showing a structure of an example of the link pin exchanging device wherein each member of the reaction force receiving member 54 are welded and fixed to each other. In FIG. 9, the same reference numbers will be used for the elements common to the above-described embodiment and description thereof will be omitted.

As shown in FIG. 9, in the link pin exchanging device 50', the connecting member 60' that connects the first member 56 and the second member 58 includes a side surface board 66 and a base surface board 68. The side surface board 66 is arranged on both sides of the link pin 46 so as to surround the first member 56, the second member 58 and the actuator 52. The base surface board 68 is a plate-like member that supports the first member 56, the second member 58 and the actuator 52 from below and is formed with an opening so as to not interfere with the link mechanism 40.

The link pin exchanging device 50' is fixed to the floor surface of the rotor hub 6A by supporting columns 69A, 69B and 69C. However, the link pin exchanging device 50' is the same as the above-described embodiment, in that the reaction force receiving member 54 (the first member 56, the second member 58 and the connecting member 60') receives the reaction force acting on the actuator 52 independent from the wall surface 7 of the rotor hub 6A that intersects with the line of extension of the operating direction of the actuator 52.

Further, the supporting columns 69A and 69B that support the base surface board 68 of the connecting member 60' are screwed to a fixing hole 43 for fixing the supporting point bracket 42 to the floor surface of the rotor hub 6A. Therefore, it is not necessary to newly create a fixing hole to fix the supporting columns 69A and 69B.

In this structure, the first member 56, the second member 58 and the connecting member 60' (the side surface board 66 and the base surface board 68) are fixed together by welding. By welding and integrating the first member 56, the second member 58 and the connecting member 60', the link pin exchanging device 50' can be mounted to the link mechanism 40 more quickly and will improve work efficiency.

Second Embodiment

Figure 10:
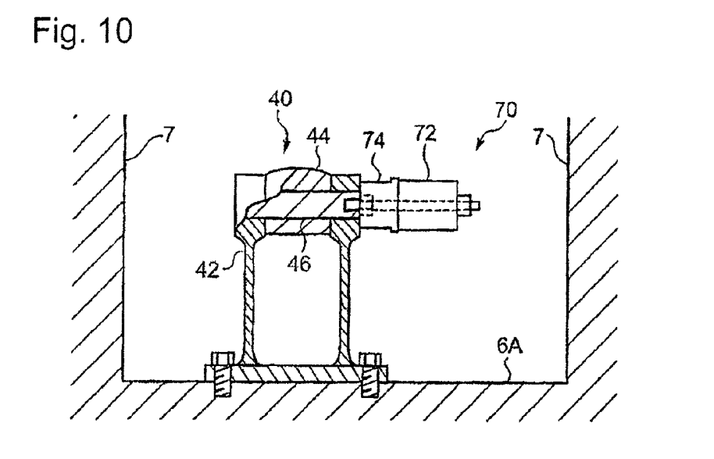
FIG. 10 is a partial cross-sectional side view of an example of a structure of a link pin exchanging device according to a second embodiment.
Figure 11:
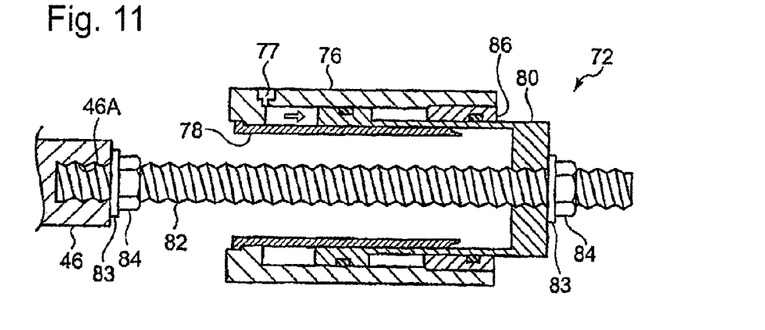
FIG. 11 is an enlarged view showing the relevant parts of the link pin exchanging device of FIG. 10.

Next a link pin exchanging device according to a second embodiment will be described. FIG. 10 is a partial cross-sectional side view of an example of a structure of the link pin exchanging device according to the second embodiment. FIG. 11 is an enlarged view showing the relevant parts of the link pin exchanging device of FIG. 10.

As shown in FIG. 10, a link pin exchanging device 70 is comprised of an actuator 72 for extracting the link pin 46 from the link mechanism 40 and a reaction force receiving member 74 that receives the reaction force acting on the actuator 72 independent from the wall surface 7 of the rotor hub 6A that intersects with the line extending from the operating direction of the actuator 72.

The actuator can be, for example as shown in FIG. 11, a center hole jack equipped with a casing 76, an inner cylinder 78, a piston rod 80 and a tension bar 82, etc.

The casing 76 is provided with a fill opening 77 through which hydraulic oil is supplied from a hydraulic pump (not shown). The inner cylinder 78 is arranged in the casing 76 and is cylindrically-shaped. The piston rod 80 is provided in a slidable manner between the casing 76 and the inner cylinder 78. One end of the tension bar 82 that is formed of a fully threaded bolt is fixed to the piston rod 80 by a nut 83 via a washer 83. The other end of the tension bar 82 is screwed to a screw hole 46A formed in the link pin 46 and is fixed by the nut 84 via the washer 83.

According to the actuator 72 configured as above, when hydraulic oil is supplied to the fill opening 77, the piston rod 80 slides in the direction of the arrow shown in FIG. 11. At this time, the tension bar 82 that is fixed to the piston rod 80 moves with the piston rod 80, thus the link pin 46 screwed to the tension bar 82 is extracted from the link mechanism 40.

A rod cover 86 is provided on the casing 76, so that when the piston rod 80 has slid to a maximum position the piston rod 80 abuts on the rod cover 86. That is, the rod cover 86 determines the maximum sliding position of the piston rod 80. Therefore, when the link pin 46 is long, even if the piston rod 80 is slid to the maximum sliding position, the link pin 46 can not be fully extracted. In such cases, the link pin 46 can be extracted in stages by using a combination of several tension bars 82 having different lengths. In this way, it is possible to completely extract long link pins 46 from the link mechanism 40.

The reaction force receiving member 74 shown in FIG. 10 is a spacer arranged between the actuator 72 and the link mechanism 40. It is preferable that the reaction force receiving member 74 is cylindrically-shaped to surround the tension bar 82 of the actuator 72 so it can evenly receive the reaction force acting on the actuator 72. The length of the reaction force receiving member (spacer) 74 can be determined according to the length of the link pin 46, or reaction force receiving members (spacers) 74 having different lengths may be exchanged appropriately according to the amount of link pin 46 to be extracted.

As described above, according to the present embodiment, the reaction force receiving member 74 receives the reaction force from the actuator 72 independent from the wall surface 7 of the rotor hub 6A that intersects with the line extending from the operating direction of the actuator 72. Thus, when exchanging the lock pin 46, it is possible to prevent the actuator 72 from disengaging or the line of action of the extraction force of the actuator 72 from misaligning from the shaft center of the link pin 46. This allows the link pin 46 in the rotor hub 6A to be exchanged efficiently.

Further, as described above, by using the jack as the actuator 72 for extracting the link pin 46 from the link mechanism 40, and the spacer arranged between the actuator 72 and the link mechanism 40 as the reaction force receiving member 74, it is possible to easily align the line of the extraction force of the actuator 72 with the shaft center of the link pin 46 when the link pin exchanging device 70 is mounted on the link mechanism 40. Further, this configuration makes it possible to reduce the size of the link pin exchanging device 70, and thus improves the workability and safety of the device.

The invention claimed is:

1. A link pin exchanging device for a wind turbine generator for exchanging a link pin of a link mechanism in a rotor hub of the wind turbine generator, the device comprising:
   an actuator configured to push the link pin so that the link pin disengages from the link mechanism; and
   a reaction force receiver configured to receive a reaction force which acts on the actuator, the reaction force receiver being independent from a wall surface of the rotor hub that intersects with an operating direction of the actuator, wherein
   the reaction force receiver includes
   a first member that supports the back surface of the actuator,
   a second member provided on an opposite side of the first member across the actuator and the link mechanism, and
   a connecting member configured to connect the first member and the second member, the connecting member including
   a pair of side surface boards configured to be arranged on both sides of the link mechanism to surround the first member, the second member and the actuator; and a base surface board supporting the first member, the second member and the actuator from below and formed with an opening for avoiding interference with the link mechanism; wherein the base surface board is configured to be supported via at least one supporting column on a floor surface of the rotor hub that intersects with the wall surface.

2. A link pin exchanging device according to claim 1, wherein the first member, the second member, the pair of side surface boards and the base board are welded together.

3. A link pin exchanging device according to claim 1, wherein the link mechanism includes:
   the link pin,
   a supporting bracket screwed to a fixing hole of the floor surface; and
   a link lever supported rotatably by the supporting bracket via the link pin,
   wherein the at least one supporting column is screwed to the fixing hole to be fixed to the floor surface.

4. A link pin exchanging device for a wind turbine generator for exchanging a link pin of a link mechanism in a rotor hub of the wind turbine generator, the device comprising:
   an actuator configured to push the link pin so that the link pin disengages from the link mechanism; and
   a reaction force receiver configured to receive a reaction force which acts on the actuator, the reaction force receiver being independent from a wall surface of the rotor hub that intersects with an operating direction of the actuator, wherein
   the link mechanism includes: the link pin;
   a link lever including a center part formed with a hole into which the link pin is insertable, and a pair of lever parts arranged on both sides of the center part; and
   a supporting bracket supporting the link lever rotatably via the link pin; and
   the reaction force receiver includes:
   a first member supporting the back surface of the actuator;
   a second member provided on an opposite side of the first member across the actuator and the link mechanism; and a connecting member configured to connect the first member and the second member, the connecting member including first and second tie bolts configured to be arranged along said operating direction of the actuator, and nuts configured to be screwed to the tie bolts;

wherein when the link lever is attached to the supporting bracket via the link pin, the first tie bolt is positioned under one of the lever parts and above the supporting bracket, the second tie bolt is positioned above the other of the lever parts, and the center part and the link pin are interposed between the first and second tie bolts.

5. A link pin exchanging device according to claim 4, wherein a spacing between the tie bolts is wider than a width of each of the lever parts.

6. A link pin exchanging device according to claim 4, the device further comprising:

an actuator receiving plate having a first through-hole into which the actuator is insertable, the actuator receiving plate being configured to hold the actuator by engaging the actuator with the first through-hole while supported by the first and second tie bolts.

7. A link pin exchanging device for a wind turbine generator according to claim 6, wherein each of the first and second members has a second through-hole through which the link pin is configured to pass.

8. A link pin exchanging method for exchanging a link pin of a link mechanism in a rotor hub of a wind turbine generator, the link mechanism including: the link pin;

a link lever having a center part formed with a hole into which the link pin is insertable, and a pair of lever parts arranged on both sides of the center part; and a supporting bracket supporting the link lever rotatably via the link pin, the method comprising the step of:

removing the rink pin from the rink mechanism by means of a rink pin exchanging device; and inserting a new link pin into the link mechanism;

which the link pin exchanging device includes:

an actuator configured to push the link pin so that the link pin disengages from the link mechanism, and a reaction force receiver configured to receive a reaction force which acts on the actuator, the reaction force receiver being independent from a wall surface of the rotor hub that intersects with an operating direction of the actuator, the reaction force receiver including a first member that supports the back surface of the actuator;

a second member provided on an opposite side of the first member across the actuator and the link mechanism; and first and second tie bolts and nuts configured to connect the first member and the second member; and wherein the step of removing the link pin includes:

arranging the first and second members on both sides of the link mechanism;

positioning the first tie bolt under one of the lever parts and above the supporting bracket, and the second tie bolt above the other of the lever parts when the link lever is attached to the supporting bracket via the link pin;

provisionally fixing the first and second members by the first tie bolt, the second tie bolt and the nuts;

aligning a shaft center of a piston of the actuator, a shaft center of the link pin and a center of a through hole of the second member;

screwing the nuts to completely fix the first and second members; and operating the actuator to remove the link pin.

9. A link pin exchanging method according to claim 8, wherein the removing the link pin includes holding the actuator between the first member and the link mechanism using an actuator receiving plate.

* * * * *